July 1, 1924.
J. E. FORD
1,499,975
ARTIFICIAL BAIT
Original Filed April 17, 1922
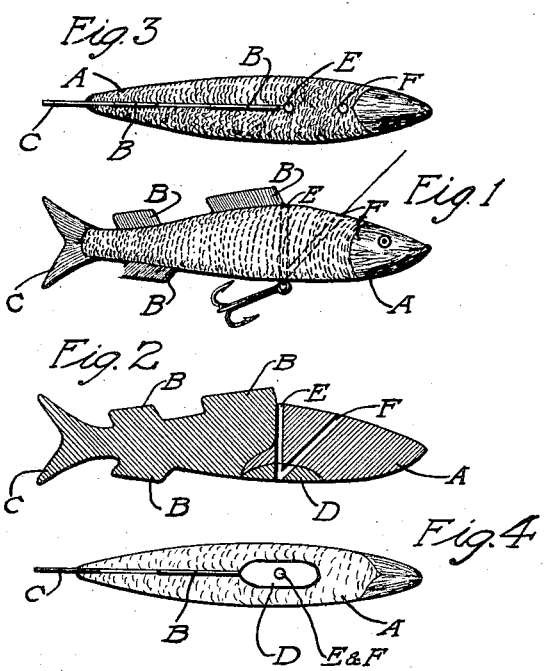
INVENTOR.
James Emanuel Ford
BY
ATTORNEYS.

Patented July 1, 1924.

1,499,975

UNITED STATES PATENT OFFICE.

JAMES EMANUEL FORD, OF GREEN BAY, WISCONSIN.

ARTIFICIAL BAIT.

Application filed April 17, 1922, Serial No. 553,799. Renewed December 3, 1923.

*To all whom it may concern:*

Be it known that I, JAMES EMANUEL FORD, a citizen of the United States, residing at Green Bay, in the county of Brown and State of Wisconsin, have invented certain new and useful Improvements in Artificial Bait, of which the following is a specification.

The invention relates to an artificial bait, and more particularly to the class of minnow baits.

The primary object of the invention is the provision of an artificial fish bait, wherein the body thereof is formed to imitate a minnow and is weighted, so as to keep the latter in an upright position, while provided within the body are holes, the same merging into each other at the bottom of the body and spaced apart at the top thereof, so that when fishing in still water the fishing line is passed through one of the holes and when fishing in moving water the said line is passed through the other hole, thereby controlling the action of such bait to have it imitate a live minnow in both characters of water.

Another object of the invention is the provision of a bait of the character named, wherein the shape thereof enables the same when pulled through the water to dive and rise identically to a live minnow, the bait being of novel form so as to make the same appear natural.

A further object of the invention is the provision of a bait of this character, which is simple in construction, thoroughly reliable and efficient in purpose, strong, durable, neat and attractive in appearance and simulating a live minnow, and inexpensive to manufacture.

With these and other objects in view, the invention consists in the features of construction, combination and arrangement of parts as will be hereinafter fully described, illustrated in the accompanying drawing and pointed out in the claims hereunto appended.

In the accompanying drawing:

Figure 1, is a side elevation of a bait constructed in accordance with the invention.

Figure 2, is a vertical longitudinal section view thereof.

Figure 3, is a top plan view.

Figure 4 is a bottom plan view.

Similar reference characters indicate corresponding parts throughout the several views in the drawing.

Referring to the drawing in detail, A, designates the body of the artificial bait, which in its formation simulates a live minnow, the body being made from any suitable material, buoyant in character, preferably wood, and has its outer surface painted to give the natural appearance to the bait.

The body A, is suitably slitted to permit the insertion of the fins and tail pieces B and C, respectively, which in this instance are made from sheet rubber, the pieces B and C, being made fast in the body in any desirable manner.

Countersunk in the bottom of the body A, intermediate of its ends is a lead weight D, which serves to keep the bait upright and also to act as a sinker to take the same under the water.

Formed vertically through the body A, centrally thereof is a bore or hole E, which opens through the top and bottom of said body, while angularly disposed to the said bore or hole E, is another bore or hole F, the latter at its lower end merging into the hole E, and at the upper being spaced forwardly of the same. These holes are to receive the line. The hole E, is adapted to receive the line when fishing in still water, while the hole F, is adapted to receive the line when fishing in moving water.

The bait is shaped in its body A, so that when pulled through the water it dives and rises the same as a live minnow.

It is of course to be understood that changes, variations and modification may be made in the construction of the bait without departing from the spirit of the invention or sacrificing any of its advantages, and as fall properly within the scope of the appended claims.

What is claimed is:

1. An artificial bait, comprising a body of buoyant material, having a weight in its bottom intermediate the ends thereof, flexible fins and tail pieces carried by the body, said body having vertical and angular passages therethrough in the vertical central plane of the same, and a colored coating on the body.

2. An artificial bait having a buoyant body provided with vertical and angular passages in the vertical central plane of the same intermediate its ends, said passages opening through the top and bottom of the body and at their lower ends merging into each other.

In testimony whereof I affix my signature.

JAMES EMANUEL FORD.